United States Patent [19]
Webster

[11] Patent Number: 5,660,370
[45] Date of Patent: Aug. 26, 1997

[54] VALVE WITH FLEXIBLE SHEET MEMBER AND TWO PORT NON-FLEXING BACKER MEMBER

[75] Inventor: Milo E. Webster, Yarmouth Port, Mass.

[73] Assignee: Integrated Fludics, Inc., Plainville, Conn.

[21] Appl. No.: 612,324

[22] Filed: Mar. 7, 1996

[51] Int. Cl.⁶ ............................. F16K 7/12; F16K 31/06
[52] U.S. Cl. ......................... 251/129.17; 251/61.1; 251/331; 137/884; 137/885
[58] Field of Search ........................ 251/61.1, 331, 251/129.17; 137/884, 885

[56] References Cited

U.S. PATENT DOCUMENTS

| | | | |
|---|---|---|---|
| 3,312,238 | 4/1967 | Voit, Jr. ................ | 251/61.1 X |
| 3,653,408 | 4/1972 | Coiner .................. | 251/61.1 X |
| 4,304,257 | 12/1981 | Webster ................ | 251/331 X |
| 4,848,722 | 7/1989 | Webster ................ | 251/61.1 |
| 4,852,851 | 8/1989 | Webster ................ | 251/61.1 |
| 4,858,883 | 8/1989 | Webster ................ | 251/61.1 |
| 5,197,192 | 3/1993 | Wylie et al. ............ | 251/61.1 X |

*Primary Examiner*—Kevin Lee
*Attorney, Agent, or Firm*—McCormick, Paulding & Huber

[57] ABSTRACT

A valve has a flexible sheet member which moves toward and away from a flat, non-flexing sheet member to cover and open two holes in the nonflexing sheet member to block or permit fluid flow between passageways in a second valve body portion member. The flexible sheet member is extendible into a recess formed in a first valve body portion member above the two holes so that fluid flows from one passageway through a chamber formed between the non-flexing sheet member surface and the faring surface of the flexible sheet member. The plunger head of a solenoid forces the flexible sheet member into contact with the non-flexing sheet member and when excited causes the plunger head to be moved out of contact with the flexible sheet member allowing the flexible sheet member to uncover the holes in the nonflexing sheet member. Vacuum is present at the valve site and draws the flexible sheet member away from the non-flexing sheet member substantially immediately as the plunger head is withdrawn from contact with the flexible sheet member. The solenoid is releasably engageable with a solenoid receiving opening in the first valve body portion at the valve site.

10 Claims, 8 Drawing Sheets

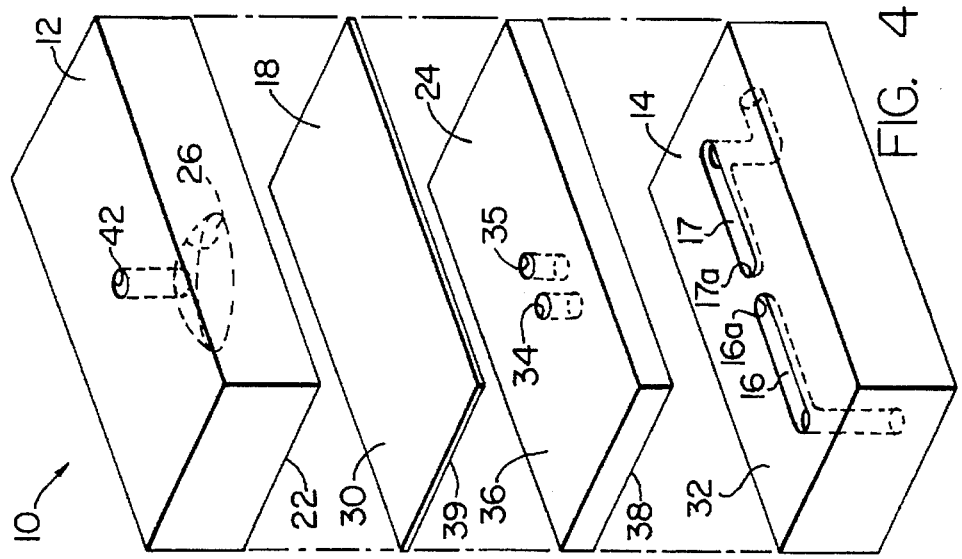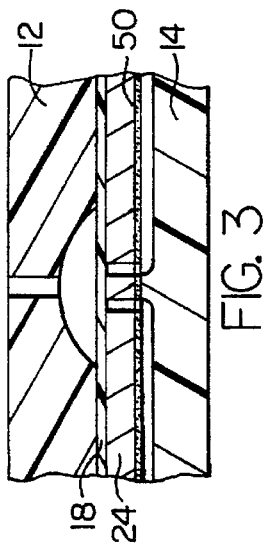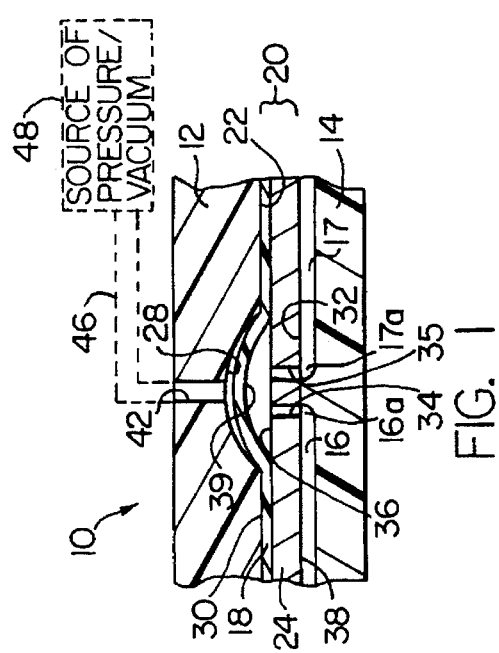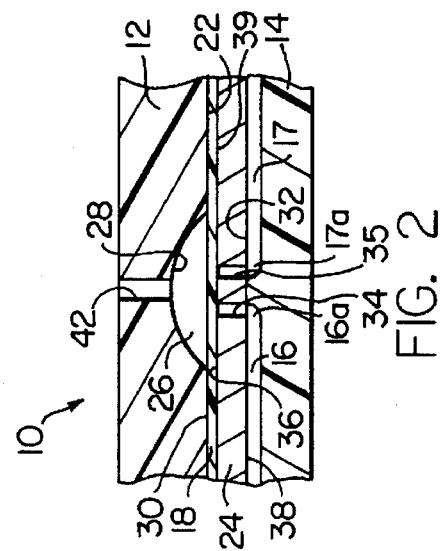

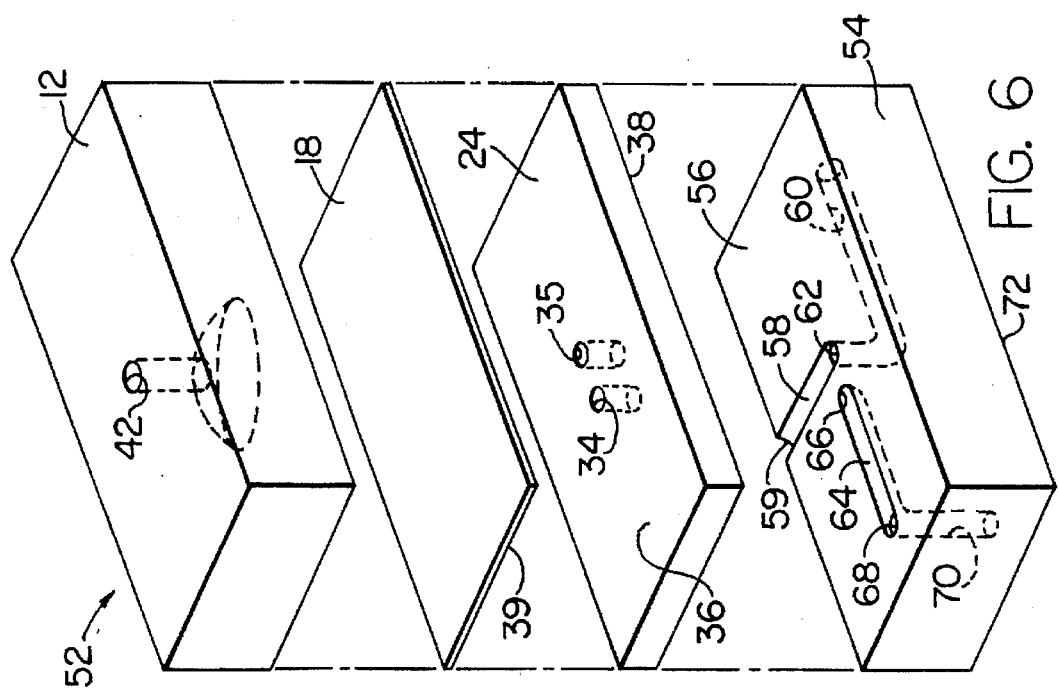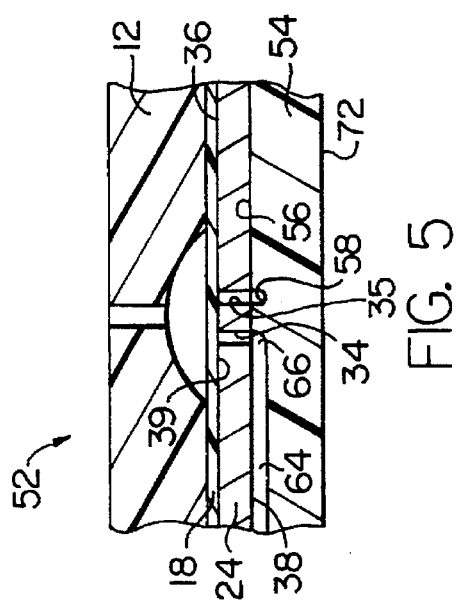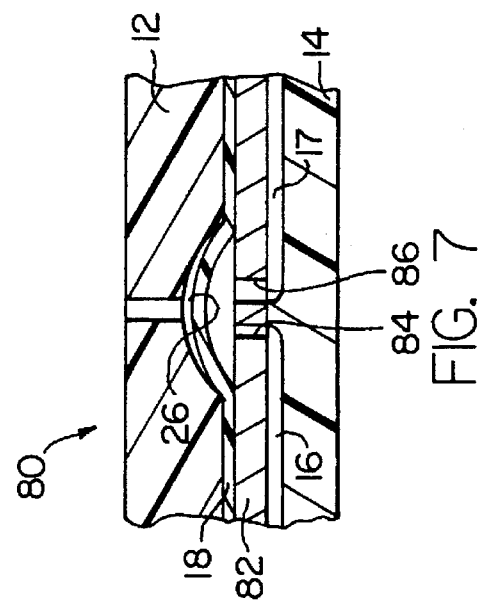

VALVE WITH FLEXIBLE SHEET MEMBER AND TWO PORT NON-FLEXING BACKER MEMBER

BACKGROUND OF THE INVENTION

The present invention relates generally to valves, particularly microvalves, and more specifically relates to a valve that employs a very thin flexible sheet member to seal against at least one of two ports in a non-flexing, substantially flat backer member to provide or block fluid communication between passageways terminating at the ports at the valve site. The valve is particularly suited for use in valve matrixes or arrays of the general type used in flow networks for handling various types of fluids or liquids.

In accordance with an earlier invention covered by my U.S. Pat. No. 4,304,257, I disclosed a valve that includes a body member that has a firm and stable support surface and a flexible sheet member that has a surface for conforming and mating with the surface of the valve body member. There are at least two fluid flow channels in the surface of the body member separated from each other by a land portion. A mechanical actuator is employed to flex the sheet member between a first position in which a surface of the sheet is in mating and sealing engagement with the surface of the body member to block flow between the two channels and a second position in which the sheet surface is spaced from the first position to allow fluid flow across the land surface between the two flow channels.

The flexible sheet member is a manifold diaphragm sheet made of polyurethane or silicone and of sufficient thickness such that heads formed on the ends of stems of the mechanical actuators can be embedded in the sheet. This requires the sheet to have substantial thickness. Because the sheet is an elastomer, were it able somehow to be made thinner, it could be gas pervious which is undesirable.

The actuators are solenoid operated which are not only bulky but heavy and employ substantial power for actuation. This is somewhat limiting to the function of the valve, particularly when many similar valves are assembled together in a manifold environment. The actuators also require extremely sensitive adjustment.

In accordance with my earlier invention, the flexible sheet is pulled physically downwardly into an aperture so that the surface of the sheet which is engageable with the firm and stable support surface is withdrawn from that surface plating two or more fluid passageways in communication. The flexure is all in one direction, that is, downwardly from the horizontal and returned to the horizontal.

Also in accordance with my earlier invention, when the flexible sheet is pulled away from the support surface, it exposes the land which is coincident with the support surface. A space is created, which when filled with a fluid flowing from one channel or passageway, can then flow out the second or additional passageways in communication with the space. An improvement over my earlier patent allows flow across the land to be channeled or directed to permit such flow to take place substantially immediately upon the flexible sheet surface being withdrawn from the support surface rather than waiting for the space to become filled or substantially filled.

A further improvement to my earlier patent reduces the flexing of the flexible sheet to avoid undue stress concentration at any one point or points and secondly, to reduce the tendency of the sheet to become stressed beyond its yield-point.

The improvements to my earlier '257 patent are disclosed in my U.S. Pat. Nos. 4,848,722, 4,852,851 and 4,858,883 assigned to the same assignee as the present invention. In the above patents, a valve with a flexible sheet member and capable of solenoid actuation using fluid or vacuum is disclosed that has at least one track in contact with the mylar or flexible sheet wherein the surface is broken with a concave void or a "canal". In the valve described in the patents, the flexible sheet member is deformed or stretched at the valve site as it is flexed to engage and disengage against the curved surface of the valve site to provide the desired communication or block the flow of fluid between the passageways at the valve site. Although the wear is improved over my earlier patent with the above design, the flexible sheet member at the valve site still flexes approximately 50% from an at rest position and is still required to engage or seal against the ridges or edges of the channel ends or openings to provide the desired communication or block the flow of fluid between the passageways at the valve site.

A further disadvantage of the valve of the above patents is that the valve site cannot be made fail-safe in the event of a loss of pressure or vacuum to seal the flexible sheet against the valve site surface thus allowing fluid to communicate between passageways.

Accordingly it is a general aim of the present invention to provide a further improved valve with a flexible sheet member that substantially reduces the distance the sheet member must be flexed to provide the desired communication or block the flow of fluid between the passageways at the valve site.

It is a further aim in one embodiment of the present invention to provide an improved valve with a flexible sheet member that seals against at least one of two spaced holes or ports in a substantially flat, non-flexing surface and which holes or ports are in registration with respective passageways at the valve site to provide the desired communication or block the flow of fluid between the passageways at the valve site.

It is a still further aim of the present invention to provide an improved valve with flexible sheet member that is capable of actuation by means of a solenoid which seals the valve when at rest with a spring or mechanical hold down and a constant vacuum which opens the valve when the solenoid is excited.

It is yet a further aim to provide an improved valve with a flexible sheet member that is capable of actuation by means of pressure and vacuum through a three way valve which may be either built in or remote from the valve.

It is a yet further aim of the present invention to provide a valve array that is capable of a high density arrangement with mechanical solenoid operation to form a matrix of valve sites.

It is a still further aim of the present invention to provide an improved flow through valve with a flexible sheet member.

SUMMARY OF THE INVENTION

In accordance with the present invention, a valve having a flexible sheet member covers and uncovers two holes in a non-flexing sheet member at a valve site. The valve has a first valve body portion member with a recess into which the flexible sheet member can be extended to uncover the two holes in the non-flexing sheet member so that passageways in registration with the respective holes in the non-flexing sheet member and formed in a second valve body portion member are in fluid communication with one another when the flexible sheet member is drawn into the recess and fluid communication is blocked when the flexible sheet member is forced into contact with the non-flexing sheet member.

In a further aspect of the invention, a solenoid has a plunger head which moves toward and away from the flexible sheet member to force the flexible sheet member to cover at least one of the two holes in the non-flexing sheet member to block fluid communication and when the solenoid is excited to withdraw the plunger head to allow the flexible sheet member to move away from and uncover the holes in the non-flexing sheet member to allow fluid communication.

In a further aspect of the invention, the valve site is provided with a constant vacuum to draw the flexible sheet member substantially immediately away from the holes when the solenoid is exalted. This feature eliminates the need for a pressurized source or pressure pump to be involved with the operation of the valve site.

BRIEF DESCRIPTION OF THE DRAWINGS

Other features and advantages of the present invention will become readily apparent from the following written description and drawings wherein:

FIG. 1 is a cross-sectional enlarged view of a shut-off valve body embodying the valve and flexible sheet member of the present invention showing the valve in its open condition to provide the desired communication between passageways at the valve site;

FIG. 2 is a cross-sectional enlarged view of the shut-off valve body embodying the valve and flexible sheet member of FIG. 1 showing the valve in its shut-off condition to block the flow of fluid between passageways at the valve site;

FIG. 3 is a cross-sectional view of the valve and flexible sheet member of the present invention showing in enlarged view an adhesive layer between the non-flexible Mylar sheet and the upper surface of the lower valve body member;

FIG. 4 is an exploded perspective enlarged view of a typical construction of the valve body of FIGS. 1 and 2;

FIG. 5 is a cross-sectional view of a typical flow through valve body embodying the valve and flexible sheet member of the present invention;

FIG. 6 is an exploded perspective enlarged view of the flow through valve body illustrated in FIG. 5;

FIG. 7 is a cross-sectional view of a flow regulating shut-off valve body embodying the valve and flexible sheet member of the present invention;

WRITTEN DESCRIPTION OF PREFERRED EMBODIMENTS

Figure 8:
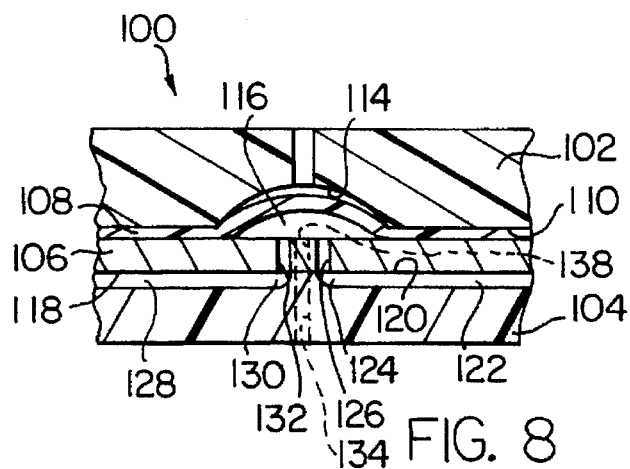
FIG. 8 is a cross-sectional view of an alternate embodiment of the shutoff valve body embodying the valve and flexible sheet member with multiport backer having three ports at the valve site.

Turning now to the drawings and considering the invention in further detail, the basic valve body embodying the present invention is shown in an enlarged cross-sectional view in Figs. 1 and 2 and is generally designated 10. A number of valve bodies may be arranged as an integral valve array or valve matrix as explained in further detail below in connection with the discussion of FIG. 5. The valve body 10 includes a first valve body portion member 12 and a second valve body portion member 14 which may be referred to as the upper and lower valve body members, respectively. The valve body members may be made of acrylic material or any other noncorrosive, relatively inert, material which may be machined or molded.

A plurality of passageways 16,17 through which fluid may flow are formed in the lower body portion member 14. The passageways may be holes, grooves, flow through channels or any convenient fluid conduit form generally well known to those in the art. Reference may be made to any of the above mentioned patents for further information and explanation and the disclosures of which patent references are incorporated herein by reference. As will be apparent connecting tubes may lead to and from the passageways to fluid reservoirs and/or equipment.

A flexible sheet member 18 which may be a sheet of polyethylene film of the type sold by Dupont under the tradename Mylar, or other suitable material that flexes is placed at an interface generally designated 20 between the upper and lower valve body portion members with the flexible sheet member positioned adjacent the downwardly facing surface 22 of the upper valve body portion member 12. An extra non-flexing layer or backer member 24 made of Mylar or other suitable material for example, metal "shim stock", is located between the flexible sheet member 18 and the upwardly facing surface 32 of the lower valve body portion member 14. The upper and lower valve body portion members together with the flexible sheet member 18 and non-flexing backer member 24 therebetween form a sandwich. The upper valve body portion member 12 may be bolted, screwed, bonded or otherwise attached using other well known means to the lower valve body portion member 14 to form the sandwiched structure. As illustrated, two valve body portion members are shown but it will be recognized there can be any number of valve body portions sandwiched together. Alternately the valve body members, non-flexing sheet and flexible sheet may be adhesively held to one another or may be molecularly bonded.

The upper valve body member 12 has a recess portion 26 at the location of the valve site and is defined by a concave surface 28 formed in the surface 22 of the upper valve body portion member and the upper surface 30 of the flexible sheet member 18 which faces the surface 22. In the illustrated embodiments, passageways 16,17 terminate in orifices or holes 16a,17a in the upper surface 32 of the lower valve body 14 at the valve site. The orifices 16a,17a are spaced apart and the non-flexing backer member 24 has corresponding ports or holes 34,35 therethrough in registry with the orifices 16a,17a. When the flexible sheet 18 is flexed into the recess portion 26, the valve is in its open flow condition and provides fluid communication between the passageways 16,17. When the flexible sheet 18 is forced into contact with the upper flat surface 36 of the non-flexing Mylar backer member 24, the bottom surface 39 of the flexible sheet covers or seals against the flat surface 36 and seals the holes 34,35 to shut-off fluid communication between the passageways 16,17. A control passageway 42 extends between the surface 28 of the recess portion 26 and is connected by an appropriate conduit 46 and source of pressure and/or vacuum 48 shown in phantom. In the basic illustration of the present invention, the valve is closed when pressure is exerted against the upper surface of the flexible sheet member at the valve site and is open when a vacuum is applied to the flexible sheet member at the valve site.

As illustrated in a preferred embodiment in FIG. 4, the extra layer (in contrast to prior art valves where the flexible sheet member seals against the edges of a groove, hole or canal) of non-flexing Mylar backer member 24 is thicker than the flexible sheet member 18 and may be approximately 0.003 to 0.015 inches thick while the flexible sheet 18 may be 0.0005 inches thick to provide a ratio of 6:1. Obviously other dimensions may be used dependent on material and other design considerations. For purposes of a continued example of one preferred embodiment, the non-flexing Mylar backer member 24 has two holes or ports punched therethrough each having an approximate diameter of 0.031 inches on 0.062 inch centers. As described above, the holes 34,35 provide a conduit to the next adjacent layer, in this example, the lower valve body portion member 14 which may have configurations (tracks, canals, grooves, channels and so forth) similar to those disclosed in the above referenced patents. The non-flexing Mylar backer member 24 may be adhesively adhered to the lower valve body portion 14 containing the tracks, grooves, etc. by a thin adhesive layer 50 as illustrated in FIG. 3, and since the non-flexing Mylar backer member 24 has only two ports or holes at each valve site, there are no tracks below the surface of the block, the potential for "cross-talk" that exists in the three-way valves of my previous patents is eliminated.

A further benefit of the present invention is that the sealing is Mylar-to-Mylar surface with the sealing sites only being holes and not track edges or grooves as in my previous patents. Furthermore, the surface finish of Mylar film is far superior to a machined and polished surface.

A further benefit and advantage of the valve design of the present invention is the non-flexing Mylar backer member 24 can be dedicated to only holes and tracks, grooves, canals, etc., and therefore the manufacturing of the part can be by any number of mass production methods including injection molding, stamping, casting, chemically etching, etc. as known in the art. The substantial cost reduction that may be realized using mass production techniques may provide for designs which lend themselves to being disposable as a package or component which is particularly desirable in diagnostic applications.

It is also possible to laminate into the valve structure various membranes that serve as a diffusion medium for gases that may emanate from biological or non- biological fluids or serve as a transfer or exchange medium (osmotic) between two liquids or gases or between a liquid and a gas.

Turning to FIG. 4, the valve body shown in FIGS. 1 and 2 embodying the valve and flexible sheet member of the present invention is illustrated in an exploded perspective enlarged view wherein the upper valve body portion member 12, thin flexible Mylar sheet 18 and non-flexible Mylar backer member 24 are substantially as shown and described above. The upper surface 32 of the lower valve body portion member 14 is adjacent to the lower surface 38 of the non-flexing Mylar body member 24. The upper surface, as shown, has grooves or tracks, also known as canals, 16,17 in the surface 32 of the lower valve body 14. The lower surface 38 seals the grooves or tracks 16,17 when the valve body is assembled. As clearly shown in FIG. 4, the tracks or grooves 16,17 are not sealed by the thin, flexible Mylar sheet 18.

Turning now to FIGS. 5 and 6, the valve and flexible sheet member with a two port non-flexing backer member embodying the present invention is illustrated therein in a "flow through" configuration. The "flow through" valve is designated generally 52 and appears very similar to the valve described above having an upper valve body portion member 12, thin flexible Mylar sheet 18 and non-flexible Mylar backer member 24. In FIGS. 5 and 6, the lower valve body portion member 54 has an upper surface 56 in abutting contact with the lower surface 38 of the backer member 24. The surface 56 of the valve includes a groove 58 in registration and in communication with the hole or port 35 in the backer member 24. As shown for illustrative purposes, the groove 58 has one end 62 in communication with a passageway 60. The surface 56 also has a channel 64 having one end 66 in registration and in communication with the hole or port 34 in the backer member 24. The opposite end 68 is in communication with a passageway 70 terminating in the lower surface 72 of the valve body portion member 54. When the structure is assembled and the valve is in its shut-off condition, that is, the holes 34,35 are sealed or covered by the surface 39 of the thin flexible Mylar sheet member 18 at the valve site, fluid communication is established on a flow through basis between the passageway 60, through the groove 58 and exiting the outlet 59 which outlet 59 is typically coupled to a hose, tube or other fluid connector. At some time, for example during the course of an analysis, it may be desired to add a different fluid or reagent to the flow-through fluid by operating the valve so that the second fluid can be added through the passageway 70, through channel 64, through hole 34, through the chamber formed between the surface 39 of the flexible sheet member 18 and the surface 36 of the backer member 24 at the valve site when the valve is operated, back through the hole 35 into the groove 58 to be mixed with the flow-through fluid entering the passageway 60. It will be appreciated that numerous configurations can be accommodated with the valve design of the present invention.

An alternate embodiment of the present invention is illustrated in FIG. 7 and is generally designated 80. The valve body is similar to the valve body described in FIGS. 1 and 2 except that the non-flexing backer member designated 82 includes an opening 84 and 86 at the valve site wherein the diameter of the opening 84 is smaller than the opening 86 to restrict or regulate the fluid flow through the valve when the valve is operated. The openings 84, 86 are in registry with the canals or channels 16,17 respectively in the lower valve body member 14 as described in connection with the description of FIGS. 1 and 2 above. Since fluid only flows through the valve site when the valve is operated, the flow can be regulated or restricted by selectively choosing the diameter of the opening 84. This feature is particularly useful when the valve is used as a mixing valve to supply a predetermined volume of fluid as required to obtain a given concentration. It will be recognized by those skilled in the art that the fluid flow restriction is determined from the diameter of the opening, fluid pressure supplied in the channel and the diameter of the second opening at the valve site.

Figure 9:
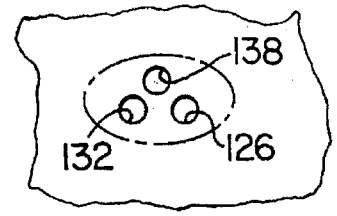
FIG. 9 is a partial top view of the non-flexing multi-port backer member of the valve of FIG. 8 showing the ports at the valve site.
Figure 10:
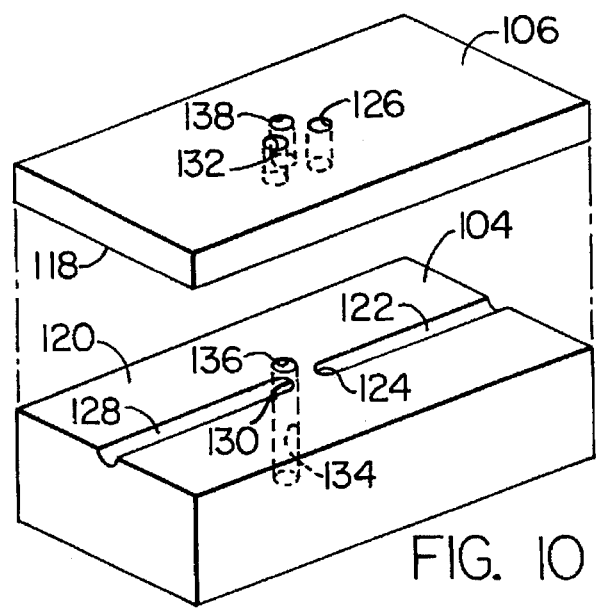
FIG. 10 is an exploded, enlarged view showing the non-flexing multiport backer and lower valve body member of the shut-off valve body of FIGS. 8 and 9.

Turning now to FIGS. 8,9 and 10, a multi-port valve body embodying the present invention is illustrated therein and is generally designated 100. The valve body 100 is similar to the valve body illustrated and described above. The valve body 100 includes an upper valve body portion member 102, a lower valve body portion member 104, a non-flexing backer member 106 and very thin flexible sheet member 108. The flexible sheet member 108 is sandwiched between the lower surface 110 of the upper valve body portion member 102 and the upper surface of the non-flexing backer member 106. The lower surface 118 of the non-flexing backer member 106 is adjacent to the upper surface 120 of the lower valve body member 104 and is used to seal channels or grooves in the surface 120 to form the desired passageways which terminate at the ports in the non-flexing backer member 106. As best shown in FIG. 10, the surface 120 of the lower valve body portion member 104 has a first groove 122 terminating at an end 124 which end is in registration with a port 126 in the non-flexing backer member when the valve is assembled. A second groove 128 terminates at an end 130 which end is in registration with the port 132 in the non-flexing backer member 106 when the valve is assembled. For purposes of example, a passageway 134 extends through the lower valve body member 104 terminating at an end 136 which end is in registration with the port 138 in the nonflexing backer member 106 when the valve is assembled. The upper valve body portion member 102 includes a recess 114 at the valve site and into which a portion of the flexible sheet member 108 is drawn when the valve is operated. When the valve is operated, a chamber 116 is formed and defined in the area at the valve site due to the sheet member 108 being deformed when drawn away from the nonflexing backer member 106 at the valve site. As best seen in FIGS. 9 and 10, the nonflexing backer member 106 includes three openings or ports 126,132,138 at the valve site (shown by the dashed line oval in FIG. 9). This valve configuration is particularly advantageous when it is desired to converge or mix two fluids together. For example, it may be desirable to mix fluid entering the channel 122 with fluid entering the channel 128 and discharging the mixed fluid through the passageway 134 when the valve is operated. As in the case of the valves described above, dead spots where fluid may remain after the valve operates and closes are eliminated thus preventing any contamination during subsequent operations. It can be seen from the valve of FIGS. 8,9 and 10 that various multiport combinations and configurations can be realized using the valve design of the present invention. It will also be recognized from above that one of the ports 126 or 132 can be made to function as a restrictor thus allowing fluids entering the channel 122 to be mixed in a desired concentration with fluid entering the channel 128.

Figure 11:
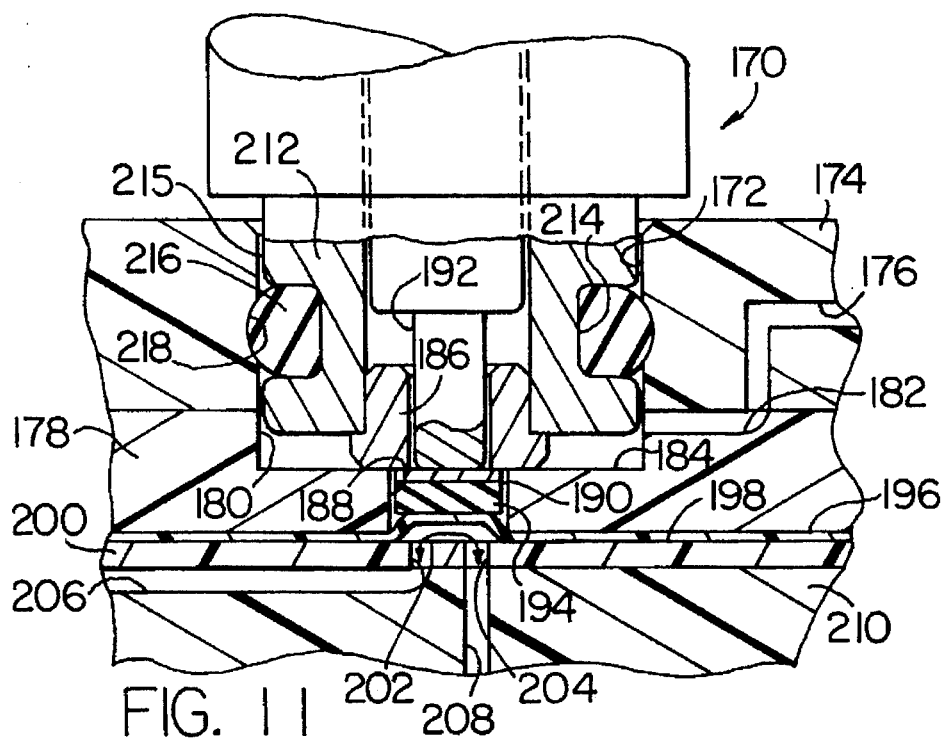
FIG. 11 is an enlarged partial cross-sectional view of one embodiment of a solenoid actuated valve at a valve site.
Figure 14A:
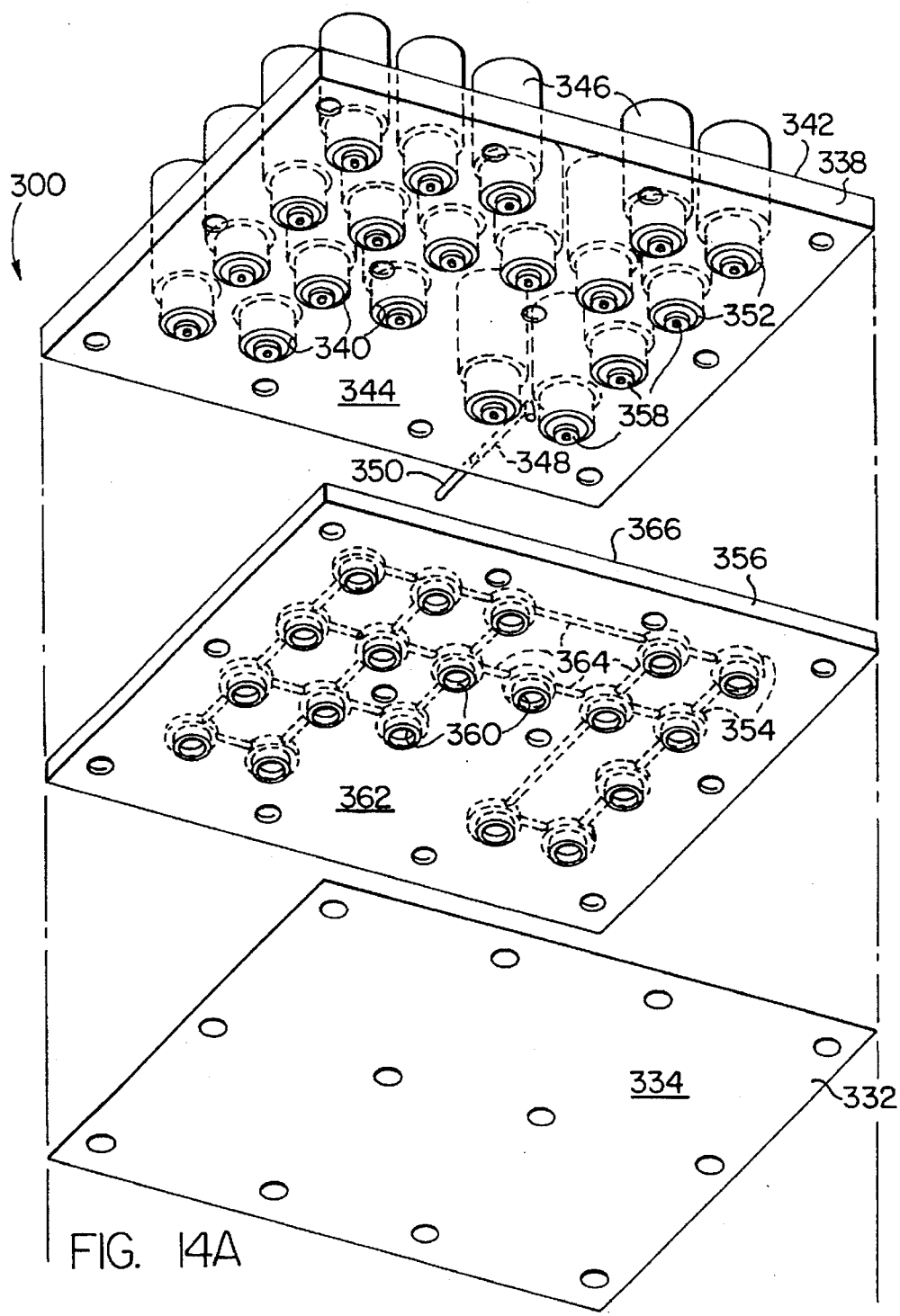
FIG. 14 is an exploded perspective enlarged view of a valve array embodying the valve and flexible sheet member with two port backer and solenoid actuator embodying the present invention.
Figure 14B:
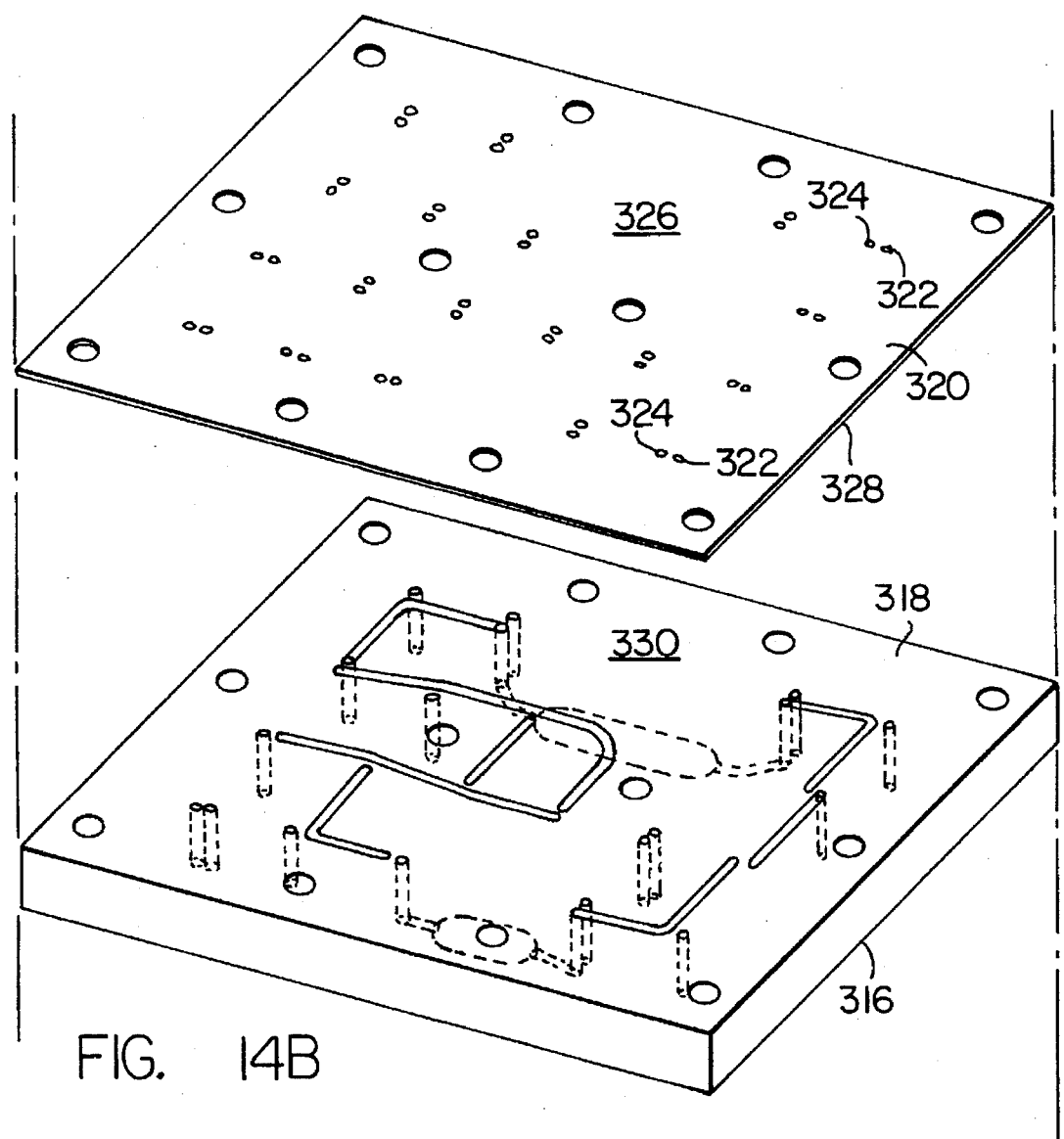
Figure 14C:
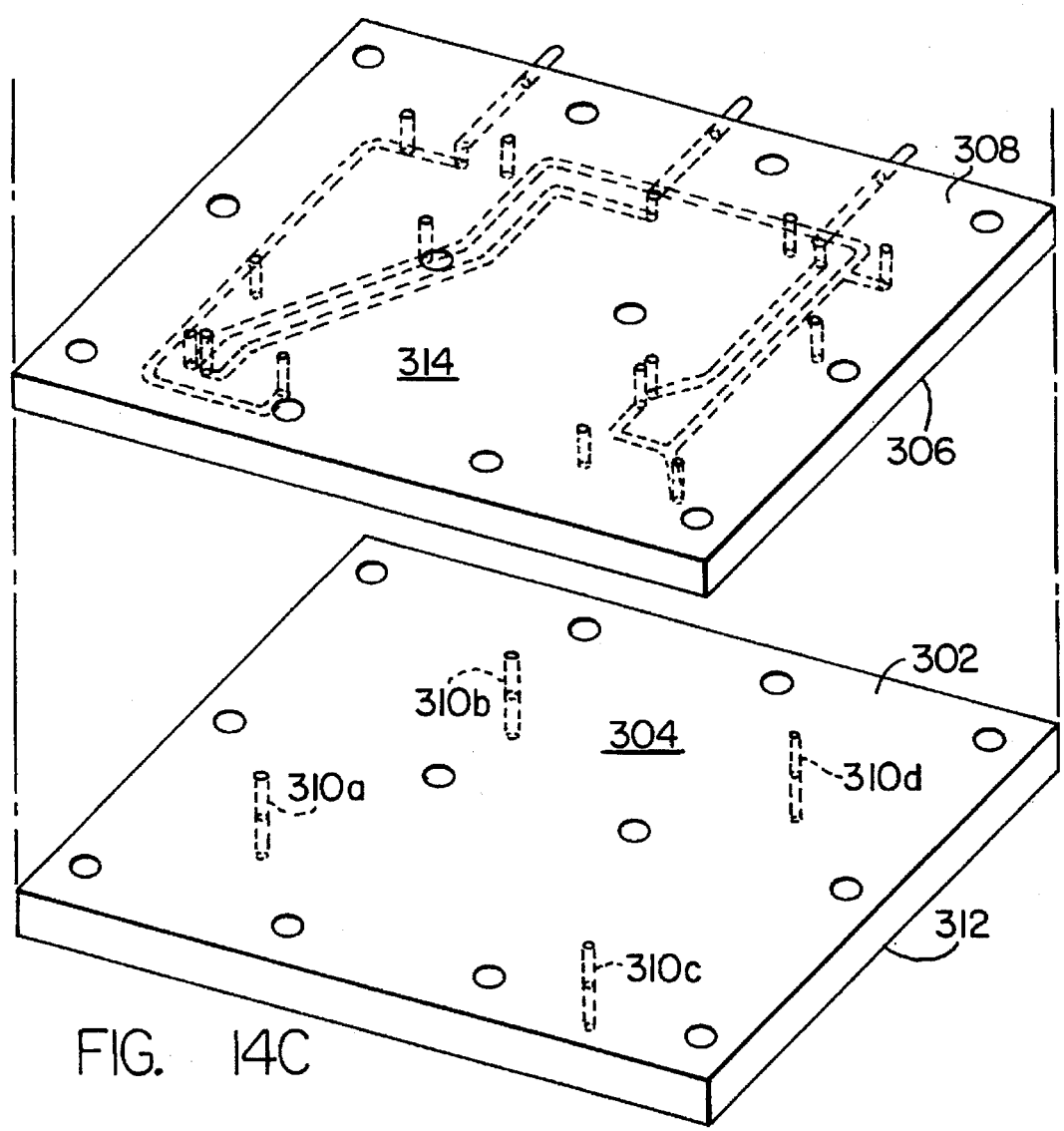

Turning now to FIG. 11, an exemplary solenoid actuated valve site such as might be found in a valve array such as the array illustrated and discussed below in connection with FIG. 14 is shown in an enlarged partial cross sectional view with the valve operated to provide fluid communication between the two ports at the valve site. As illustrated, a solenoid generally designated 170 is inserted and held in an opening 172 axially with the valve site and which opening is formed in a plastic or acrylic solenoid mounting block 174 with the appropriate passageways for pressure or vacuum such as the passageway in this case designated 176 and formed therein. The block 174 is mated with a second plastic or acrylic block 178 which has a solenoid receiving opening 180 such that when the blocks 174 and 178 are assembled and bonded together, a single continuous solenoid receiving cylindrical opening is defined and formed and has a diameter dimensioned to tightly receive the solenoid. The block 178 has a passageway or groove 182 in the surface of the block 178 and which groove is in alignment with the passageway 176 in the block 174 thus providing communication to the solenoid receiving opening 180. In the embodiment illustrated, the passageway 176 and 182 provide communication with the valve site to apply vacuum to the thin flexible sheet member 196 to draw it away from the two port backer surface when the solenoid 170 is operated as will be more apparent below. The solenoid receiving opening has a cheek or shoulder portion 184 which acts as a stop and comes into abutting contact with the lower end portion 186 of the solenoid 170. The block 178 includes an axially aligned opening 188 through which the end portion 190 of the plunger 192 of the solenoid 170 passes therethrough. The opening 188 is in axial alignment with the valve site so that the plunger head 194 carried by the solenoid plunger 192 can be moved toward and away from the thin flexible sheet member at the valve site. When the solenoid 170 is in a de-energized state, the spring force of the solenoid forces the plunger 192 toward the valve site causing the plunger head 194 to move the thin flexible sheet member 196 into contact with the surface 198 of the non-flexing backer member 200 to seal the holes 202,204 punched therethrough and which holes are in registration with the respective passageways 206,208 in the block 210 to block or shut-off fluid communication between the passageways.

The solenoid 170 may be of any miniature type generally well known including those having a threaded base however, such solenoids are costly due to the extra machining required and a valve array or valve site using such a solenoid requires additional precision machining to provide a screw thread to hold the solenoid. As explained in further detail below, applicant's invention includes a novel method for retaining a solenoid 170 at the valve site. As illustrated, the solenoid lower portion 212 which is received in the solenoid receiving opening 172 includes an outer peripheral circumferential or annular groove 214 in its surface 215. An O-ring 216 is carried by the annular groove 214 and increases the diameter of the solenoid lower portion 212 along the annular groove. The solenoid receiving opening 172 includes a inner peripheral surface detent 218 positioned to receive the outer surface of the O-ring 216 when the solenoid 170 is inserted into the opening 172. The location of the surface detent 218 as illustrated is a spherical undercut positioned slightly toward the valve site to bias the solenoid body towards the valve site when the solenoid is inserted. Because the groove 218 is undercut, some axial force is required to "snap" the solenoid into holding or retaining engagement within the opening 172. This arrangement not only provides for a positive seat and holding arrangement for the solenoid 170 but also allows the solenoid to be easily removed through the application of an axial pulling force exceeding the holding force of the O-ring against the inner peripheral groove surface. The O-ring further functions to provide an airtight seal so that vacuum applied at the valve site via the passageway 176 is always present at the solenoid side of the thin flexible sheet member 196 so that when the solenoid 170 is actuated to retract the plunger 192 away from the valve site, the vacuum which is present at the upper side of the flexible sheet member 196 substantially immediately and instantaneously "pulls" the sheet from the surface of the non-flexing backer member 200 to allow fluid communication between the ports 202,204. In the arrangement of the present invention, if power is lost, the solenoid is in a fail-safe condition with the plunger 192 being mechanically biased against the surface of the flexible sheet member to seal the ports at the valve site.

The plunger head 194 may have a flat surface seal against the flexible sheet member or may have a slight radius surface seal against the flexible sheet member if a "dimple" is desired in the flexible sheet material at the valve site. The sealing surface material of the plunger head 194 may be rubber or other such material which provides a "very gentle treatment" to the contact surface of the flexible sheet member. Consequently, the flexible sheet member receives "very gentle treatment" since the sealing surface is against the flat Mylar surface of the non-flexing two port backer member. The flexible sheet member can therefore be made very thin and does not have to be "tough" as required in prior flexible seal valves.

The volume of the valve site opening or chamber between the flexible and non-flexing sheet members can also be adjusted as desired by controlling the throw of the solenoid plunger to allow the plunger head 194 to only retract a given, desired distance from the flexible sheet member surface to create the desired volume chamber.

Figure 12:
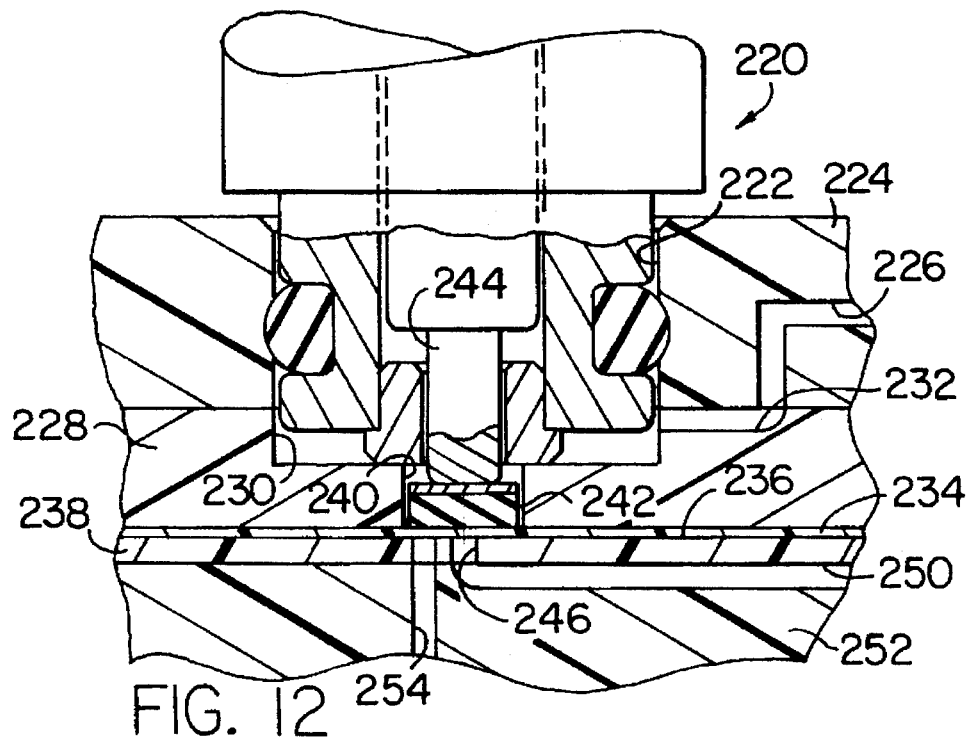
FIG. 12 is an enlarged partial cross-sectional view of an alternate embodiment of a solenoid actuated valve at a valve site.

Turning to FIG. 12, an alternate embodiment of a solenoid actuated valve at a valve site similar to the valve of FIG. 11 is illustrated therein and is generally designated 220. As illustrated, the solenoid 220 is inserted and held in an opening 222 axially with the valve site and in the solenoid mounting block 224 with the appropriate passageways for pressure or vacuum such as the passageway designated 226 formed therein. The block 224 is mated with a second block 228 which has a solenoid receiving opening 230 such that when the blocks 224 and 228 are assembled and bonded together, a single continuous solenoid receiving cylindrical opening is defined and formed and has a diameter dimensioned to tightly receive the solenoid. The block 228 has a passageway 232 in the surface of the block 228 and in communication with the passageway 226 in the block 224 thus providing a continuous passageway to the solenoid receiving opening 230. The passageway 226 and 232 provide communication with the valve site to apply vacuum to the thin flexible sheet member 234 to draw it away from the surface 236 of the two port backer member 238 when the solenoid 220 is operated. The block 228 includes an axially aligned opening 240 through which the end portion 242 of the plunger 244 of the solenoid 220 passes therethrough. In contrast to the embodiment of FIG. 11, the opening 240 axially aligns the plunger head 242 with one port 246 in the two port backer member 238. Since it is only necessary to seal one port of the two ports to shut-off communication at the valve site, axially aligning the plunger head to seal only one port at the valve site requires less spring force and accordingly, the solenoid can be made smaller and consume less energy to operate. When the solenoid 220 is in a de-energized state, the spring force of the solenoid forces the plunger 244 toward the valve site causing the plunger head 242 to move the thin flexible sheet member 234 into contact with the surface 236 of the two port non-flexing backer member 238 to seal the port 246 punched therethrough and which port is in registration with the passageway 250 in the block 252 to shut-off fluid communication between the passageways 254 and 250.

Figure 13:
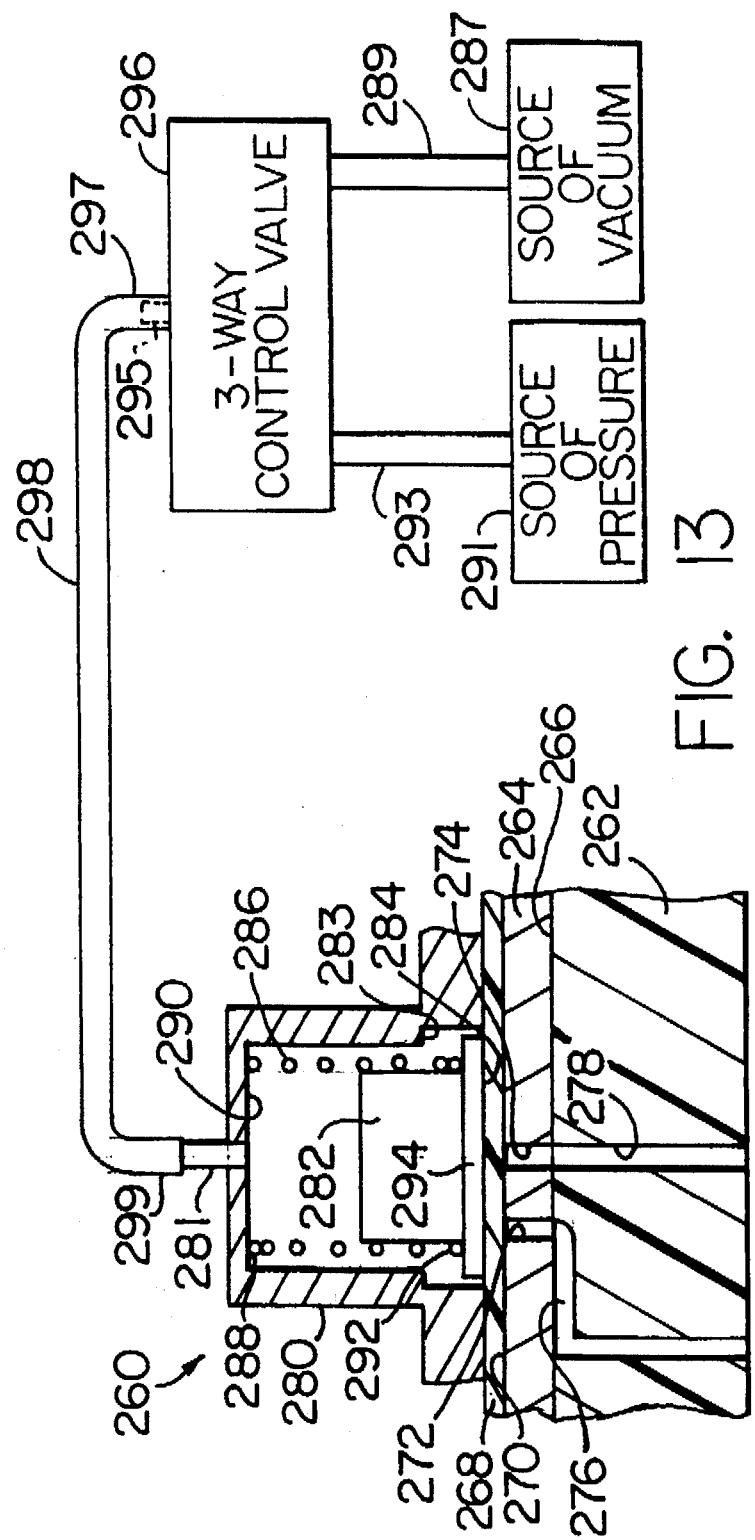
FIG. 13 is an enlarged partial cross-sectional view of a valve embodying the multi-port backer member and thin flexible sheet member of the present invention wherein the valve is operated remotely utilizing vacuum and pressure.

A number of fluid analysis procedures detect the presence of ions or other ionic mixtures of fluids passing through a given type analysis machine, particularly medical type equipment well known to those in the art. In such equipment it is important to insure that the ionic mixtures are not exposed to magnetic or electrical fields which would alter or effect the ionic mixture or its detection or readings. Consequently, solenoid valves operated by an electromagnet may induce electric or magnetic fields into the mixture being analyzed thus producing incorrect results. Turning now to FIG. 13, an alternate solenoid actuated remotely operated valve embodying the present invention is illustrated therein and generally designated 260. As in the valves described above embodying the invention, the valve 260 includes a lower valve body member 262, a non-flexing multi-port backer member 264 bonded to the surface 266 of the lower valve body member, a thin flexible sheet member 268 in contact with the surface 270 of the multi-port backer member to seal the ports 272, 274 therethrough and in registration with the groove 276 and passageway 278, respectively in the lower valve body member 262. A solenoid plunger assembly housing 280 defines an upper valve body member to hold the thin flexible sheet member 268 against the surface 270 of the multiport backer member 264. A plunger 282 is carried axially within the housing 280 for movement toward and away from the thin flexible sheet member. The plunger 282 has an annular flange 294 which includes a lower flat surface 284 which presses against the flexible sheet member to seal the ports 272, 274 due to the downward force exerted by the plunger 282 as a result of a spring 286 circumferentially surrounding the plunger and axially aligned within the plunger housing. The spring 286 has one end 288 held by the inner top side 290 of the housing 280 and has its opposite end 292 resting on and pushing against the upwardly faring surface of the flange 294 thereby urging the thin flexible sheet member against the multiport backer member to shut-off communication between the ports 272 and 274. The spring force need only be as high as necessary to overcome the pressure of a fluid flowing through the ports of the valve to shut-off the valve because pressure, as explained below is used to dose the valve. The housing 280 includes an interior, circumferential shoulder 283 to stop or restrict the upward travel or retraction of the plunger 282 by contacting the flange 294 at the upper extent of the plunger travel. The distance of the shoulder 283 above the flange 294 is set to limit the travel of the flexible sheet member 268 to its predetermined or desired travel. In a preferred embodiment, the retraction is set for 0.020 inches. The housing 280 is connected to a three way control valve represented by the block 296 via a conduit 298 having one end 299 sealingly connected to a coupling 281 in the upper portion of the housing 280. The opposite end 297 of the conduit 298 is sealingly connected to an output 295 in the three-way control valve 296 to form an airtight connection between the control valve and the housing 280. The three-way control valve 296 has one input 293 connected to a source of pressure 291 and a second input 289 connected to a source of vacuum 287. In operation, the valve is actuated when the three-way control valve 296 diverts vacuum from the source 287 to the interior of the housing 280 via the conduit 298. The vacuum is adjusted to be sufficiently high to overcome the spring force exerted on the plunger 282 to cause the plunger to be pulled away from the valve site so that the flexible sheet member 268 is pulled away from the backer member 264 to provide communication between the ports 272 and 274 at the valve site. The valve is closed or shut-off when the three-way control valve diverts pressure from the source 291 to the interior of the housing 280 via the conduit 298. The pressure aids in the closing of the valve by applying pressure to the flexible sheet member 268 to substantially instantaneously close the valve. In this way, the pressure of the spring force need only be set high enough to hold the valve closed rather than of a force which would be needed to close the valve. This configuration provides for a smaller diameter valve housing since the spring geometry can be smaller because it does not have to provide the closing force but only the holding force.

Turning now to FIG. 14, the valve and flexible sheet member with two port non-flexing backer member embodying the present invention is illustrated therein and shown for illustrative purposes as it may be utilized in a valve array with solenoid actuators and is generally designated 300. The valve array 300 includes a number of blocks having passageways, grooves, canals and so forth as described in my earlier patents and which are configured to provide the desired flow path as controlled by the valve within the flow path. As illustrated in FIG. 14, the lower most body member 302 has its upper face 304 in communication and contact with the lower surface 306 of the immediately adjacent valve body portion member 308. The valve body 302 has, for illustrative purposes, passageways 310a, 310b, 310c, 310d extending through the block 302 from its lower surface 312 through its upper surface 304 and which passageways are used to provide fluid flow into and out of the valve array and which passageways are further in registration with corresponding passageways in the valve body 308 immediately above the valve body 302. The valve body 308 has various grooves and conduits in a desired fluid flow configuration. The lower surface 306 of the block 308 is bonded to the surface 304 of the block 302 as disclosed in the above referenced patents. The valve body 308 has its upper surface 314 in contact with the lower surface 316 of the valve body block 318 with the appropriate passageways appearing in the lower surface 316 of the block 318 in proper registration with the passageways and the surface 314 of the block 308. The block 318 is also bonded to the block 308. The non-flexing mylar sheet or backer member 320 has holes 322,324 punched through the backer member 320 between the upper surface 326 and lower surface 328 of the backer member 320. The holes or ports 322,324 are located at each respective valve site and, as described above, in registration with the respective hole, passageway, flow through or groove in the block 318. The non-flexing mylar backer member 320 is molecularly bonded or adhesively adhered to the upper surface 330 of the block 318. The flexible sheet member 332 has its lower face surface 334 in facing contact with the upper surface 26 of the nonflexing mylar backer member 320. The valve array 300 has a solenoid holding body 338 configured with a number of openings 340 extending between the upper surface 342 and the lower face surface 344 of the block 338 each respectively arranged to hold a solenoid assembly 346. The block 338 as illustrated has an internal canal 348 in contact with an external conduit 350 through which a vacuum is applied as explained in further detail below. The plunger portion or section 352 is further complementary received in a respective opening 354 in the block 356 so that the plunger portion of the solenoid fits into the opening 354 to allow the plunger 358 of the solenoid 346 to extend through the opening 360 in the lower face surface 362 of the block 356. The opening 360 in the lower face surface 362 of the block 356 is in alignment with the valve site corresponding to the holes 322,324 in the nonflexing mylar backer member 320. The block 356 has grooves 364 in the upper surface 366 and interconnect each of the openings 354 at each solenoid location. When the block 356 is bonded to the block 338, a unitary block is formed and a vacuum applied at the inlet 350 is distributed to each of the solenoid locations. When the valve array is assembled, the plunger 358 of each of the respective solenoid assemblies 346 forces the flexible mylar sheet 332 into covering and sealing contact with the holes 322,324 in the non-flexing sheet backer member 320 to close or block the flow passages at the valve site. When the solenoid 346 is energized, the plunger is retracted allowing the valve to move to its open flow position. The application of vacuum at the valve site causes the flexible sheet at the valve site location to be immediately withdrawn from the surface 326 of the backer plate to provide communication between the holes 322,324. When the solenoid is de-energized, the plunger returns to its at rest position to force the flexible sheet member to cover the holes 322,324 to close the valve and block fluid flow. It can be seen that since the holes 322,324 can be located very close to one another the valve site area can be reduced substantially to provide a high density solenoid operated valve array. It will also be appreciated that the solenoid valve configuration of FIG. 12 may also be employed in the valve array of FIG. 14 to further provide a higher density valve array.

A valve having a flexible sheet member and multi-port non-flexing backer member has been presented above in several preferred embodiments. It will be recognized by those skilled in the art that numerous variations and configurations may be made to the invention as presented and therefore the invention has been presented by way of example rather than limitation.

The invention claimed:

1. A valve comprising:

a first valve body portion member having a substantially flat surface;

a second valve body portion member having a substantially flat surface;

a flexible sheet member positioned between said flat surfaces of said first and said second valve body portion members;

a non-flexing sheet member positioned between said flexible sheet member and said flat surface of said second valve body portion member;

a recess portion in the first valve body portion member formed in the flat surface and into which a portion of said flexible sheet member is extendible;

at least two ports extending through said non-flexing sheet member at spaced locations and disposed opposite said recess portion in the first valve body portion member;

at least two fluid passageways formed in the second valve body portion member and in respective registration one-for-one with said at least two ports in said non-flexing sheet member;

means for flexing said flexible sheet member toward and away from said non-flexing sheet member whereby when said flexible sheet member is flexed against the non-flexing sheet member, said flexible sheet member covering and sealing at least one of said ports in said non-flexing sheet member to block fluid communication between said two fluid passageways formed in the second valve body portion member, and when said flexible sheet member is flexed away from the non-flexing sheet member said two ports in said non-flexing sheet member are uncovered to permit fluid communication between said two fluid passageways formed in said second valve body portion member.

2. A valve as defined in claim 1 further comprising said flexible sheet member being made of a polyethylene film material and said non-flexing sheet member being made of a polyethylene film material.

3. A valve as defined in claim 1 further comprising said flexible sheet member having a thickness in the range of 0.0005 inches and said non-flexing sheet member having a thickness in the range of 0.003 to 0.015 inches.

4. A valve as defined in claim 1 wherein each of said at least two ports has a diameter in the range of 0.031 inches and are spaced from one another in the range of 0.062 inches on center.

5. A valve as defined in claim 1 wherein said first valve body portion member and said second valve body portion member are made of a non-corrosive, relatively inert material.

6. A valve as defined in claim 5 wherein said non-corrosive, relatively inert material is an acrylic material.

7. A valve as defined in claim 1 wherein said means for flexing said flexible sheet member toward and away from said non-flexing sheet member comprises a solenoid, said solenoid having a plunger head movable by spring pressure toward and away from non-flexing sheet member, said plunger head contacting and pushing against said flexible sheet member when in an unenergized state whereby at least one of said ports is covered and sealed and whereby said plunger head is retracted away from said flexible sheet member when in an energized state to allow said flexible sheet member to be extended into said recess portion in said first valve body portion member by pressure developed by fluid in said fluid passageways to permit fluid communication between said two fluid passageways.

8. A valve as defined in claim I wherein said means for flexing said flexible sheet member toward and away from said non-flexing sheet member comprises a solenoid, said solenoid having a plunger head movable toward and away from non-flexing sheet member, said plunger head contacting and pushing against said flexible sheet member when in an unenergized state whereby said at least one of said ports is covered and sealed;

a source of vacuum coupled to said first body portion to provide a vacuum between said flexible sheet member and said recess portion, and whereby said plunger head is retracted away from said flexible sheet member when in an energized state to allow said flexible sheet member to be extended into said recess portion in said first valve body portion member by said vacuum attracting said flexible sheet member into said recess portion whereby fluid in said fluid passageways is in fluid communication between said two fluid passageways.

9. A valve as defined in claim 8 further comprising said solenoid having a lower portion including an outer peripheral circumferential groove, an O-ring received within said groove, a solenoid receiving opening in said first valve body portion for axially receiving said solenoid within said first body portion at a valve site such that said plunger head is in axial alignment with said two holes in said non-flexing sheet member, said solenoid receiving opening having an inner peripheral surface detent for receiving said O-ring and said solenoid to provide an airtight seal between said flexible sheet member and said solenoid, said inner peripheral surface detent being axially positioned toward said flexible sheet member whereby said solenoid is biased toward said valve site when said solenoid is inserted or "popped in" said solenoid receiving opening.

10. A valve as defined in claim 9 wherein said solenoid is removable from said first valve body portion member by applying an axial force to said solenoid in a direction away from said valve site to overcome the biasing force holding said solenoid in said solenoid receiving opening.

* * * * *

UNITED STATES PATENT AND TRADEMARK OFFICE
CERTIFICATE OF CORRECTION

PATENT NO. : 5,660,370
DATED : August 26, 1997
INVENTOR(S) : Milo E. Webster

It is certified that error appears in the above-indentified patent and that said Letters Patent is hereby corrected as shown below:

In the Abstract, Line 9, the word "faring" should be "facing".

Signed and Sealed this

Sixth Day of January, 1998

Attest:

BRUCE LEHMAN

*Attesting Officer*     Commissioner of Patents and Trademarks